United States Patent Office 3,166,004
Patented Jan. 19, 1965

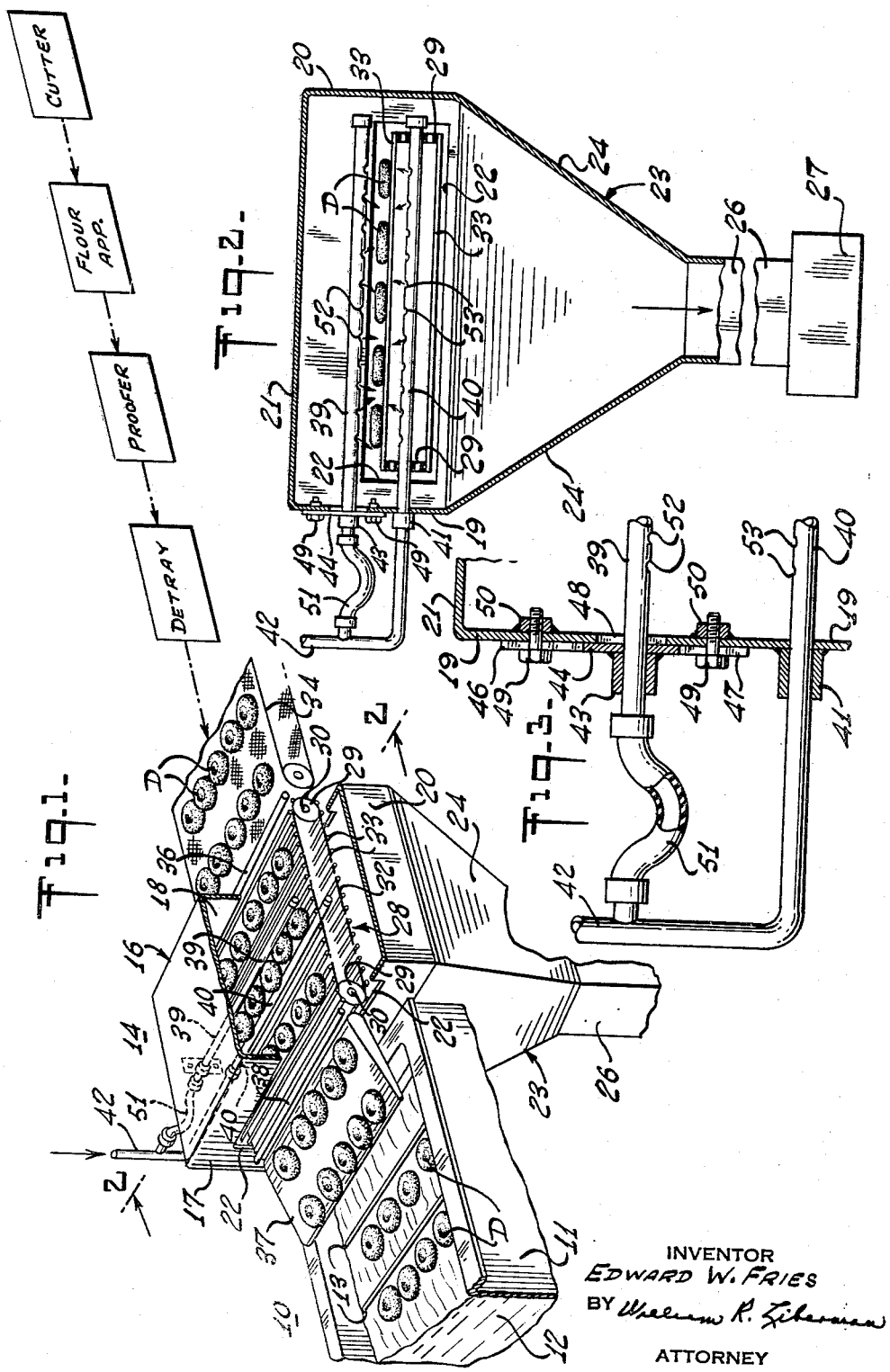

3,166,004
FLOUR REMOVAL
Edward W. Fries, Baltimore, Md., assignor to DCA Food Industries Inc., New York, N.Y., a corporation of New York
Filed Dec. 28, 1960, Ser. No. 78,979
7 Claims. (Cl. 99—352)

The present invention relates generally to an improved apparatus and method for the production of comestibles. It relates in particular to an improved method and apparatus for the treatment and deep-frying of shaped pieces of dough.

In the commercial production of deep-fried bakery products, as exemplified by raised doughnuts, the shaped cut pieces of dough are subjected to considerable handling and transportation between the formation of the dough pieces and the deep-frying thereof. Following the shaping of the dough pieces, they are frequently deposited upon trays and are loaded into or conveyed through a proofing chamber wherein the dough pieces are permitted to rise under controlled ambient conditions. The pieces of dough are then removed from the trays and fed to a deep-frying unit containing hot oil wherein the doughnuts are cooked or fried. The dough pieces are of a delicate and adhesive nature and during the handling thereof accumulate on their surfaces a relatively large amount of flour which is present on the dough carrying trays and other dough handling components. In the conventional apparatus heretofore employed, the dough pieces including the flour thereon are deposited into the deep frying hot oil. A large part of the flour separates from the dough pieces and accumulates in and is charred by the hot oil. This rapidly contaminates the oil thereby necessitating the frequent treating, handling and replenishment thereof. This is obligatory since the presence of excess flour in the oil results in accumulated deposits of charred material which adversely affects the quality and appearance of the end product. Furthermore, conventional deep-frying equipment is generally necessarily designed to accommodate such deposits and is hence of increased cost.

It is, therefore, a principal object of the present invention to provide an improved method and apparatus for the production of comestibles.

Another object of the present invention is to provide an improved method and apparatus for the production of deep-fried bakery products.

Still another object of the present invention is to provide an improved apparatus and method for the pre-treatment and deep-frying of pieces of dough.

A further object of the present invention is to provide an improved method and apparatus for the pre-treatment and deep-frying of pieces of dough wherein the contamination of the frying oil is minimized, thereby extending its useful life and minimizing the necessity for frequent handling and replenishment thereof.

Still a further object of the present invention is to provide an apparatus of the above nature characterized by its simplicity, ruggedness and efficiency of operation.

The above and other objects of the present invention will become apparent from a reading of the following description, taken in conjunction with the accompanying drawing, wherein FIGURE 1 is a perspective view, partially broken away, of a pre-treating and deep-frying apparatus embodying the present invention, the trailing apparatus elements being illustrated by block diagrams;

FIGURE 2 is a sectional view, partially broken away, taken along line 2—2 in FIGURE 1; and FIGURE 3 is a detailed enlarged sectional view illustrating the manifold coupling and support arrangement.

It has been found that by subjecting pieces of flour carrying dough to a jet of high velocity air prior to the introduction thereof into hot oil for deep-frying, a major part of the flour picked up thereby and adherent thereto, which would normally free itself from the dough and mix into the hot frying oil, is removed and, as a consequence, the necessary cleaning, treatment and replenishment of the frying oil is minimized, thereby appreciably to reduce production costs. The novel apparatus with which the above procedure is practiced is simple and may be readily applied to existing equipment. It preferably comprises a housing or cabinet immediately trailing the deep-frying unit and has longitudinally spaced entrance and exit slots. A conveyor extends through the cabinet by way of the slots and includes an endless perforated belt. A pair of manifold pipes extend transversely across the upper run of the belt and having jet defining openings formed therein are directed toward the belt upper run and are connected to a source of compressed air. The bottom of the cabinet is in the form of a hopper or funnel which leads to a suction type air separator. Pieces of dough are fed to the conveyor and are subjected to air blasts as they are transported through the cabinet to dislodge flour from the dough pieces, the flour being sucked from the cabinet by way of the hopper or funnel. The conveyor then deposits the dough pieces onto a chute or conveyor which leads into the deep-frying unit.

Referring now to the drawings which illustrate a preferred embodiment of the present invention employed in the production of raised doughnuts, reference numeral 10 generally designates a continuous deep-frying unit which may be of conventional construction and includes a longitudinally extending trough 11 which contains frying oil 12 heated to the desired temperature by any suitable means. Travelling along the length of the trough 11 are a plurality of regularly longitudinally spaced transversely extending pushers 13 which extend above and below the upper level of the oil 12. Pushers 13 are advanced at any desired rate, in any suitable manner. For example, they may be carried by and between longitudinally extending parallel pairs of sprocket chains supported and driven by corresponding engaging sprocket wheels located in the trough 11. A deep-frying unit which may be advantageously employed is described in detail in U.S. Patent No. 2,-709,955, granted June 7, 1955, to H. T. Hunter.

Located immediately anterior to or trailing frying unit 10 is a deflouring unit 14 which comprises a cabinet 16 formed of sheet metal or other suitable material and includes an upper section provided with front and rear transversely extending rectangular walls 17 and 18, respectively, rectangular side walls 19 and 20 and a top wall 21. It should be noted that one or more of the upper section cabinet walls may be hinged or provided with other means to permit the opening or removal thereof to allow ready access to the interior of the cabinet 16 for cleaning, adjusting and inspecting purposes. Formed in the cabinet front and rear walls 17 and 18 are longitudinally aligned transversely extending parallel entrance and exit slots 22.

Cabinet 16 also includes a lower section 23 in the shape of a hopper or funnel having downwardly inwardly inclined walls which depend from the lower edges of the upper section walls 17, 18, 19 and 20 and meet at the upper end of a depending vertical throat 26. Throat 26 communicates with a suction type air separator of any well known type which draws in the flour laden air from the cabinet 16 and separates and collects the flour and other solid particles. The separator 27 includes a blower whose suction end communicates with the throat 26 and a filter or a vortex type separator such as a cyclone separator.

Extending through the cabinet entrance and exit openings 22 and for the full length of cabinet 16 is a dough piece conveyor 28 whose width is substantially that of the interior of cabinet 16. Conveyor 28 includes front and rear pairs of sprocket wheels 29 mounted on shafts 30 and located forward and rearward of cabinet 16. An openwork endless belt 32 is supported by and between the sprocket wheels 29 and is driven thereby so that the upper run of the belt 32 advances toward the deep-frying unit 10. Belt 32 is advantageously formed of coarse mesh woven wire cloth or screen, and preferably consists of transversely extending rigid rods 33 interconnected and interwoven by highly flexible longitudinally extending widely spaced wire strands. Conventional motor and speed reducing means are provided for rotating the shafts 30 at the desired speed in order that the speed of the conveyor 28 and the fryer flights 13 may be properly correlated.

An endless belt delivery conveyor 34 feeds the dough pieces to conveyor 28, and includes an upper advancing run at or slightly above the level of the upper run of conveyor 28, the end runs of conveyors 28 and 34 being in confronting relationship. A first rotating roller or rod 36 is located between the ends of the upper runs of conveyors 28 and 34 and bridges the gap between these upper runs to effect the smooth even transfer of dough pieces from the one conveyor to the other, the rod being at the levels of the upper runs and being suitably driven.

Extending from the leading end of conveyor 28 is a chute or suitably driven endless feed conveyor 37 which is downwardly inclined from conveyor 28 into the trailing end of the trough 11. A second suitably driven rotating transfer roller or rod 38 is located between the confronting ends of the conveyors 28 and 37.

In order to remove flour borne by the dough pieces travelling through cabinet 16, they are therein subjected to a blast of air sufficient to dislodge the surplus flour carried thereby. There are provided a pair of upper and lower manifold pipes 39 and 40 respectively, located in cabinet 16 above and below the upper run of the conveyor 28 and approximately midway between the cabinet front and rear walls 17 and 18, manifold pipes 39 and 40 extending for substantially the full width of the interior of cabinet 16. Lower pipe 40 is supported by a collar 41 affixed to cabinet side wall 19 and is connected at its outer end to a feed pipe 42 which, in turn, is connected to a source of air under compression. Upper pipe 39 extends through and is supported by a collar 43 affixed to a bracket plate 44 having vertical slots 46 and 47 formed in the upper and lower portions thereof, the plate 44 slidably covering a vertical slot 48 formed in cabinet side wall 19. Pipe 39 extends through slot 48. Registering with each of the slots 46, 47 in the bracket plate 44 is a lock bolt 49 having a threaded shank passing through a corresponding opening in side wall 19 and engaging an aligned mating nut affixed to the inner face of the side wall 19. Thus, the vertical position of upper pipe 39 may be adjusted by loosening bolts 49, sliding the pipe-carrying bracket plate 44 upwardly or downwardly, as desired, and then tightening bolts 49.

The outer end of pipe 39 is connected by way of suitable couplings and a flexible pressure hose 51 to the compressed air pipe 42. Longitudinally spaced downwardly directed jet-defining openings are formed in the underside of upper pipe 39 along the length thereof, and longitudinally spaced upwardly directed jet-defining openings 53 are formed in upper side of lower pipe 40 along its length. The inner ends of the pipes 52 and 53 are closed. It should be noted that the air suction capacity of suction member 27 is appreciably greater than the flow of air through jets 52 and 53. Thus, all the flour carrying air is drawn through the throat 26, and there is no flow of air outwardly through slots 22.

Conveyor 34 may be preceded by any desired apparatus, at least one of which effects the application of flour to the dough pieces, and may include, for example, a detray unit, a proofing unit, a traying unit, a flouring unit, a cutting device and the like. Equipment of the above nature is described in detail in U.S. Patent No. 2,897,772, granted August 4, 1959, to H. T. Hunter.

In operation, the cut and proofed dough pieces D having adhering and enlodged flour deposits are delivered by conveyor 34 to the conveyor 28. As the dough pieces are transported by conveyor 28 through cabinet 16, and pass between the pipes 39 and 40, they are subjected from above and below to a high velocity blast of air directed against the flour carrying dough pieces from the jets 52 and 53 to dislodge the flour from said pieces of dough and entrain the dislodged flour in the ambient air. The flour laden air will flow downwardly in cabinet 12 and into hopper 26, where it is drawn by the device 27 which separates the flour and discharges the air. The flour stripped pieces of dough are discharged by the conveyor 28 onto the conveyor or chute 37 which delivers them into the fryer trough 11 to be cooked and transported in the usual manner. However, by reason of the stripping of the flour from the dough pieces in the manner and with the apparatus as above described, the contamination of the oil is radically reduced.

While there has been described hereinabove and illustrated a preferred embodiment of the present invention, it is apparent that numerous alterations, omissions and additions may be made without departing from the spirit thereof.

I claim:

1. An improved cooking apparatus of the character described, comprising a receptacle containing a liquid cooking medium, a cabinet trailing said receptacle and having oppositely disposed entrance and exit openings formed therein, said exit opening being directed toward said receptacle, an endless belt conveyor disposed in said cabinet and extending between said exit and entrance openings and having an upper run advancing from said entrance opening to said exit opening and to a discharge end of said conveyor, and means to direct high velocity air along said upper run of said conveyor, and air suction means connected to said cabinet.

2. An apparatus according to claim 1, wherein said endless belt is perforated.

3. An apparatus according to claim 1, wherein said means to direct high velocity air includes a pipe connected to a source of compressed air and located in said cabinet above said conveyor upper run and having downwardly directed openings formed therein.

4. An apparatus according to claim 3, including means for vertically adjusting the portion of said pipe located in said cabinet.

5. An apparatus according to claim 1, wherein said endless belt is perforate and said means to direct high velocity air includes a pipe connected to a source of compressed air and located in said cabinet below said conveyor upper arm and having upwardly directed openings formed therein.

6. An apparatus according to claim 5, including a second pipe connected to a source of compressed air and located in said cabinet above said conveyor upper run and having downwardly directed openings formed therein.

7. An apparatus according to claim 1, wherein the lower section of said cabinet below said conveyor is of funnel shaped configuration and said air suction means is connected to the bottom of said lower section.

References Cited in the file of this patent

UNITED STATES PATENTS

| | | |
|---|---|---|
| 559,498 | Scharrer | May 5, 1896 |
| 1,236,405 | Cleveland | Aug. 14, 1917 |
| 1,673,686 | Kremmling | June 12, 1928 |
| 1,711,763 | White | May 7, 1929 |
| 1,859,304 | Lipsius | May 24, 1932 |
| 2,065,306 | Freiss | Dec. 22, 1936 |
| 2,177,323 | Kirkendall | Oct. 24, 1939 |
| 2,207,584 | Gardner | July 9, 1940 |
| 2,219,410 | Bradshaw | Oct. 29, 1940 |
| 2,229,167 | Carpenter | Jan. 21, 1941 |
| 2,709,955 | Hunter | June 7, 1955 |
| 2,902,921 | Brodrick | Sept. 8, 1959 |
| 2,915,397 | Telkes | Dec. 1, 1959 |
| 2,978,325 | Ashley | Apr. 4, 1961 |